US010503362B2

(12) United States Patent
Guo

(10) Patent No.: US 10,503,362 B2
(45) Date of Patent: Dec. 10, 2019

(54) METHOD AND APPARATUS FOR IMAGE SELECTION

(71) Applicants: Alibaba Group Holding Limited, Grand Cayman (KY); Jiahong Guo, Hangzhou (CN)

(72) Inventor: Jiahong Guo, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 187 days.

(21) Appl. No.: 15/326,349

(22) PCT Filed: Jul. 17, 2015

(86) PCT No.: PCT/CN2015/084320
§ 371 (c)(1),
(2) Date: Jan. 13, 2017

(87) PCT Pub. No.: WO2016/019794
PCT Pub. Date: Feb. 11, 2016

(65) Prior Publication Data
US 2017/0205966 A1    Jul. 20, 2017

(30) Foreign Application Priority Data

Aug. 8, 2014  (CN) .......................... 2014 1 0389892

(51) Int. Cl.
G06F 3/048       (2013.01)
G06F 17/30       (2006.01)
(Continued)

(52) U.S. Cl.
CPC .......... G06F 3/0482 (2013.01); G06F 3/0488 (2013.01); G06F 3/04842 (2013.01);
(Continued)

(58) Field of Classification Search
CPC .................... G06F 17/30268; G06F 3/0482
See application file for complete search history.

(56) References Cited

U.S. PATENT DOCUMENTS 8,886,231 B2    11/2014  Estermann et al.
8,903,838 B2    12/2014  Hunter et al.
(Continued)

FOREIGN PATENT DOCUMENTS

CN    103440247       12/2013
CN    103440247 A     12/2013
(Continued)

OTHER PUBLICATIONS

International Search Report to corresponding International Application No. PCT/CN2015/084320 dated Oct. 22, 2015.

Primary Examiner — Scott T Baderman
Assistant Examiner — Mario M Velez-Lopez
(74) Attorney, Agent, or Firm — James J. DeCarlo; Greenberg Traurig, LLP

(57) ABSTRACT

Disclosed in the embodiments of the disclosure is a method of selecting images for quickly selecting multiple images from a gallery of a mobile device, comprising: sequentially searching for a location image in the gallery; if the location image can be found, using the location image as a boundary and selecting the multiple images from other images of the plurality of images outside of the boundary; if the location image cannot be found, selecting multiple images from the plurality of images of the gallery; marking the selected images. Locating images via marking minimizes the interference in image selection, improves the efficiency in filtering images, and shortens the time therein, reducing the cost in selecting images.

18 Claims, 11 Drawing Sheets

(51) Int. Cl.
*G06F 3/0482* (2013.01)
*G06F 16/51* (2019.01)
*G06T 1/00* (2006.01)
*G06F 3/0488* (2013.01)
*G06F 3/0484* (2013.01)
*G06F 16/54* (2019.01)
*H04L 29/08* (2006.01)

(52) U.S. Cl.
CPC ............. *G06F 16/51* (2019.01); *G06F 16/54* (2019.01); *G06T 1/0007* (2013.01); *G06T 2200/24* (2013.01); *H04L 67/10* (2013.01)

(56) References Cited

U.S. PATENT DOCUMENTS

| | | | |
|---|---|---|---|
| 9,100,245 | B1 | 8/2015 | Andrews et al. |
| 9,104,687 | B2 | 8/2015 | Euresti et al. |
| 9,129,641 | B2 | 9/2015 | Folgner et al. |
| 9,246,958 | B2 | 1/2016 | Stoop et al. |
| 9,325,783 | B2 | 4/2016 | Arfvidsson et al. |
| 9,965,895 | B1 * | 5/2018 | Gray ................... G06T 19/006 |
| 2005/0141032 | A1 * | 6/2005 | Yamamoto ............. G06K 15/00 |
| | | | 358/1.17 |
| 2008/0162649 | A1 * | 7/2008 | Lee ...................... G06Q 10/107 |
| | | | 709/206 |
| 2009/0280859 | A1 * | 11/2009 | Bergh ............... G06F 17/30256 |
| | | | 455/556.1 |
| 2009/0297066 | A1 * | 12/2009 | Hatayama ............... A63F 13/12 |
| | | | 382/311 |
| 2010/0017526 | A1 * | 1/2010 | Jagannath ........... H04L 12/1859 |
| | | | 709/229 |
| 2012/0076427 | A1 | 3/2012 | Hibino |
| 2014/0122451 | A1 | 5/2014 | Euresti et al. |
| 2015/0006523 | A1 | 1/2015 | Das et al. |
| 2015/0116541 | A1 * | 4/2015 | Gilman ............. G06F 17/30265 |
| | | | 348/231.5 |
| 2016/0078139 | A1 | 3/2016 | Clinton |
| 2016/0078582 | A1 | 3/2016 | Bhathena et al. |
| 2016/0110031 | A1 * | 4/2016 | Johnson ........... G06F 17/30038 |
| | | | 715/716 |
| 2016/0163064 | A1 * | 6/2016 | Ruf .......................... G06T 7/20 |
| | | | 382/103 |
| 2016/0173726 | A1 | 6/2016 | Ubillos et al. |
| 2016/0275312 | A1 | 9/2016 | Stoop et al. |
| 2017/0316734 | A1 * | 11/2017 | Asai ........................ G09G 5/00 |

FOREIGN PATENT DOCUMENTS

| | | |
|---|---|---|
| CN | 103475572 A | 12/2013 |
| JP | 2014-59836 | 4/2014 |
| KR | 10-2009-0085470 | 8/2009 |
| KR | 10-2011-0032762 | 3/2011 |
| KR | 10-2012-0113738 | 10/2012 |
| WO | 2016013885 A1 | 1/2016 |
| WO | 2016164922 A1 | 10/2016 |

\* cited by examiner

METHOD AND APPARATUS FOR IMAGE SELECTION

CROSS-REFERENCE TO RELATED APPLICATIONS

This application claims the benefit of priority of Chinese Patent Application No. 201410389892.9, filed on Aug. 8, 2014 and PCT Application No. PCT/CN2015/084320, filed on Jul. 17, 2015, which are incorporated herein in their entirety by reference.

BACKGROUND

Field of the Disclosure

The disclosure relates to the field of image processing, and, in particular, to a method and apparatus for image selection.

Description of the Related Art

At present, because of relatively advanced mobile devices, most users expect to share their life events via images taken in their daily lives, at school, or during recreational activities. When a user shares images via social software on a mobile device, multiple attempts are often needed to send a large number of images due to the limitation on the number of images allowed to be sent in one attempt. During the attempts, the user will have to access the album on the mobile device repeatedly to select and send multiple images.

Currently, each time a user accesses an album of a mobile device to select images, existing technology usually requires the user to scroll through the images and find out whether an image has been sent. The user will then be able to continue scrolling through and selecting images that are unselected.

However, browsing or selecting an image in the above method easily leads to judgment errors. This is especially the case when one has to distinguish among continuously-shot images. Current methods not only slow down browsing speed, but further cause image transferring errors, resulting in the repeated sharing or sending of images.

SUMMARY

The embodiments of the disclosure provide an image selecting method, so as to address the problem of slow speeds in image filtering in the prior art due to the inability to quickly distinguish between sent images and other images.

The technical schemes disclosed via the embodiments of the disclosure are to address the above technical problem, described as follows.

Disclosed is a method of selecting images for quickly selecting multiple images from a gallery of a mobile device, comprising: searching from a plurality of images in the gallery to determine if a location image can be found; if the location image can be found, using the location image as a boundary and selecting the multiple images from other images of the plurality of images outside of the boundary; if the location image cannot be found, selecting an image from the plurality of images of the gallery; and marking the selected images.

Alternatively, a marking method for marking the selected images comprises: selecting multiple images from the gallery, marking, from the multiple images arranged in a sequential order, the last image, and using the last image as the location image.

Alternatively, a marking method for marking the selected images comprises: selecting multiple images from the gallery, marking all of the selected multiple images, and using the selected multiple images as the location images.

Alternatively, a marking method for marking the selected images comprises: selecting multiple images from the gallery; separately marking the last image and the rest of the images from the multiple images, and using the last image and other images as location images, wherein the last image and other images are marked differently.

Alternatively, the selected images are marked via at least one of the following identifying methods: a dynamic identification and a special style identification.

Alternatively, the dynamic identification includes at least one of the following: jitter identification and flicker identification; the special style identification includes at least one of the following: border identification, text identification, and symbol identification.

Alternatively, if the location image can be found, the procedure involving using the location image as a boundary and selecting the multiple images from other images of the plurality of images outside of the boundary further includes the following steps: if the location image is selected, marking the location image again so as to prompt users to decide whether to re-select the location image; if it is necessary to re-select the location image, re-selecting the location image and removing the marking from the location image; if it is not necessary to re-select the location image, continuing with the selection and selecting images other than the location image.

The disclosure further discloses an image selecting apparatus for selecting multiple images from a gallery, comprising: an image searching unit, configured to search for a location image in the gallery; an image identifying unit, configured to identify the location image and use the location image as a boundary; an image selecting unit, configured to select images, other than the location image, in the gallery; and an image marking unit, configured to mark the selected images.

The disclosure further discloses an image sending method for quickly selecting multiple images from a gallery and sending them out, comprising: selecting multiple images from the gallery, and sending out the selected images; using the images selected from the gallery in this attempt as first location images, and marking the first location images; accessing the gallery for a second time; using the first location images as a boundary, and continuing to select images other than the first location images, sending out the selected images; meanwhile, using the selected images in the second attempt as second location images, and marking the second location images; and accessing the gallery again to select images until all images that need to be selected are selected and sent out.

Alternatively, the first location images include the last image selected from the gallery in the first attempt, and using the first location images as intermediate cut-off points.

Alternatively, the first location images include all the images selected from the gallery in the first attempt, the first location images are marked as sent images, and other images are selected based on the first location images.

Alternatively, the first location images include all the images selected from the gallery in the first attempt, and the last image selected from the gallery and other images are marked separately, wherein the last image is used as an intermediate cut-off point.

Alternatively, the marking method for marking the second location images is the same as the one for marking the first location images.

Alternatively, the first location images and the second location images are marked via at least one identifying method of jitter identification and flicker identification or in at least one identifying method of border identification, text identification, and symbol identification; or the first location images and the second location images are marked via at least one identifying method of jitter identification and flicker identification, and at least one identifying method of border identification, text identification, and symbol identification.

The disclosure further discloses an image sending apparatus for selecting and sending multiple images from a gallery, including: an image searching unit, configured to search for a location image in the gallery; an image identifying unit, configured to identify the location image and use the location image as a boundary; an image selecting unit, configured to select images, other than the location image, in the gallery; and an image sending unit, configured to send and share the images selected by the image selecting unit; and an image marking unit, configured to mark the sent and shared images.

In addition, the disclosure discloses a prompting method for sending repeated images, configured for offering users a prompt about whether to send the sent images again, comprising: selecting multiple images from a gallery, sending out the selected images, and marking the sent images; accessing the gallery again, and when a selected and sent image is selected, marking the sent image automatically and offering users a prompt about whether to re-send the selected image; if it is necessary to re-send a sent image, re-selecting the sent image so that its marking is removed and a selected status is displayed, and finishing sending out the image; if it is not necessary to re-send a sent image, continuing to filter and select other images, and finishing the sending operation.

Optionally, automatically marking a sent image includes at least one of the following: jitter identification and flicker identification.

As can be seen from the technical schemes above, beneficial effects of The image selecting method provided by the embodiments of the disclosure include: according to the implemented image selecting method of the disclosure, when browsing or searching and sending images from a gallery of a mobile device, the last image of those sent or being sent can be marked so as to identify its position; and when accessing the gallery to select images again after a period of time, the user may scroll through and select the remaining images based on the boundaries from the previously marked images or the marking of the sent images, and send and share the selected images. By locating marking of the images, clear boundaries can be set between 'sent' and 'unsent' images in the gallery, making it possible to locate boundaries for sent images and quickly distinguish those from unsent images, thereby minimizing any interference in the image selection process, leading to improved image filtering efficiency, shortened image browsing time, and reduced cost in image selection.

Moreover, the image selecting method implemented by the disclosure can also quickly identify selected images and prompt users to decide whether to send sent images again in the event of an unintentional operation on a mobile device or when a user intentionally selects to send a sent image, thereby effectively improving the filtering efficiency in the image sending and sharing processes, reducing the risk of unintentional operations, and avoiding unnecessary duplication of images.

BRIEF DESCRIPTION OF THE DRAWINGS

In order to more clearly illustrate the technical schemes in the embodiments of the disclosure, the drawings needed in the description of the embodiments or the prior art will be introduced briefly below. Those of ordinary skill in the art may also derive other drawings from these drawings without undue difficulty.

DETAILED DESCRIPTION

The embodiments of the disclosure provide an image selecting method, capable of marking and locating images in a gallery of a mobile terminal, thereby minimizing any unnecessary visual interference and improving filtering efficiency and speed for any needed image browsing and scrolling process.

First, description of an image selecting method according to one embodiment of the disclosure is provided.

Figure 1:
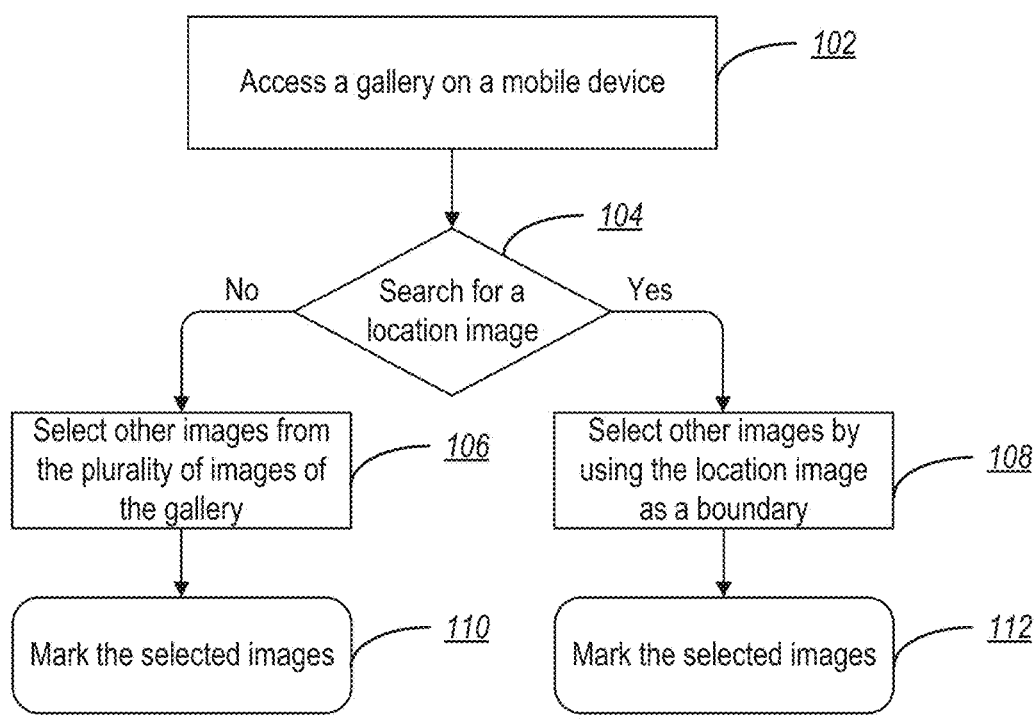
FIG. 1 is a flow diagram of an image selecting method provided according to an embodiment of the disclosure.

The image selecting method, as shown in FIG. 1, is used for quickly selecting multiple images from a gallery of a mobile device (102), and the image selecting steps include: searching from a plurality of images in the gallery to determine if a location image can be found (104); if a location image can be found, using the location image as a boundary, and selecting the multiple images from other images of the plurality of images outside of the boundary (108); if the location image cannot be found, returning to the gallery, and selecting other images from the plurality of images of the gallery (106); and marking the selected images (110, 112).

A marking method for marking the selected images comprises any one of the following marking methods: (1) selecting multiple images from the gallery; marking, from the multiple images arranged in a sequential order, the last image; and using the last image as the location image; (2) selecting multiple images from the gallery; marking them; and using all the multiple identified images as the location images; and (3) selecting multiple images from the gallery; separately marking the last image and the rest of the images from the multiple images, and using the last image and other images as location images; however, the last image and other images are marked differently.

Moreover, if the location image can be found, the step of clicking to select the location image further includes: if a user selects a location image, marking the location image again and prompting the user about whether to re-select the location image; if it is necessary to re-select the location image, re-selecting it and removing the marking; and if it is not necessary to re-select the location image, continuing to search and select other images from the gallery.

Regarding how the image is marked, the image identifying methods presented in this embodiment include a dynamic identification, a special style identification, or a combination of both. Moreover, if a location image is selected, the location image may be marked again and the user is prompted to decide whether to re-select the location image; if it is necessary to re-select the location image, the location image is re-selected and the marking is removed; and if it is not necessary to re-select the location image, the user continues scroll through and select other images from the gallery. The dynamic identification includes at least one of the following: jitter identification and flicker identification; the special style identification includes at least one of the following: border identification, text identification, and symbol identification.

According to the image selecting method presented in the embodiment of the disclosure, images selected are marked and used as location images, so that when accessing the gallery for a second time, desired images can be quickly selected from the gallery, thereby effectively improving efficiency of image selection and reducing the risk of unintentional operations or of selecting duplicated images.

Figure 2:
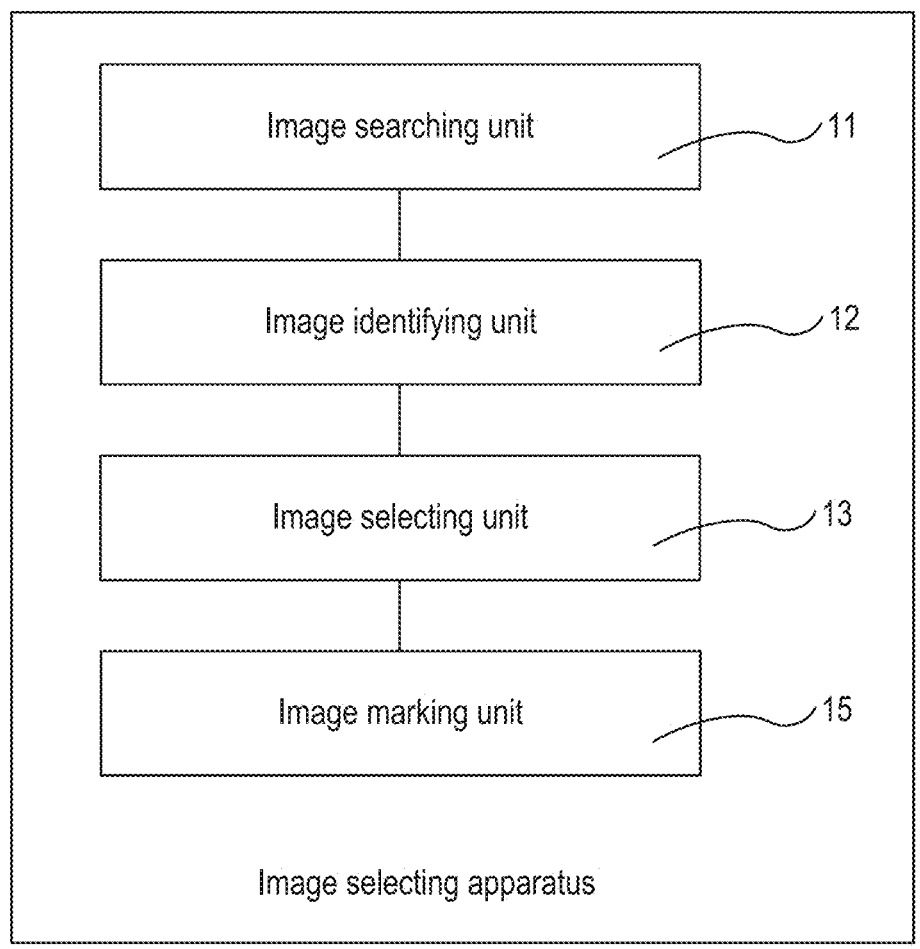
FIG. 2 is a block diagram of an image selecting apparatus provided according to an embodiment of the disclosure.

In addition, for the image selecting method implemented by the disclosure, the disclosure provides an image selecting apparatus, as shown in FIG. 2, and the image selecting apparatus includes an image searching unit 11, configured to search for a location image in a gallery.

In one embodiment, the image searching unit 11 is primarily configured to determine whether a location image exists in the gallery (the location image being an image that has been identified in the gallery, and the location image is used as a boundary for any subsequent image selection).

The image selecting apparatus additionally includes an image identifying unit 12, configured to identify the location image.

In some embodiments, the image identifying unit 12 further includes an identifying module and a control module. During a search process of the image searching unit 11, the identifying module identifies whether a found image is a location image. If the identifying module identifies the found image as the location image, the location image will be used as a boundary. The image selecting unit 13, under the control of the control module, selects an image from images outside of the boundary. If the identifying module does not identify the found image as the location image, the control module controls the image selecting unit 13 to select images from the beginning of the gallery.

The image selecting apparatus additionally includes an image selecting unit 13, configured to select images, other than the location image, in the gallery. In one embodiment, the image selecting unit 13 selects images based on a location image. If a location image exists, the location image is used as a boundary to facilitate an image selection. If no location image exists, images may be selected from the gallery as desired.

The image selecting apparatus additionally includes an image marking unit 15, configured to mark the selected images. In one embodiment, the image marking unit 15 includes a dynamic identification module and a special style identification module. After the image selecting unit 15 selects images, the selected images can be identified via at least one of the dynamic identification module and the special style identification module, making them location images, so as to avoid repetitive browsing and selection for a subsequent accessing of the gallery.

The image selecting apparatus implemented by the disclosure is a combined structure of an image searching unit 11, an image identifying unit 12, an image selecting unit 13, and an image marking unit 15, capable of marking sent images with the image marking unit 15, facilitating the searching and identifying performed by the image searching unit 11 and the image identifying unit 12, thereby achieving a quick selection of images.

In order to prepare those skilled in the art in better understanding the technical schemes of the disclosure, the technical schemes in the embodiments of the disclosure will be clearly and fully described below with references to the drawings in the embodiments of the disclosure. It is apparent that the described embodiments are merely a part of the embodiments of the disclosure, rather than all the embodiments. On the basis of the embodiments of the disclosure, all other embodiments obtained by those skilled in the art without making any creative effort shall fall within the protection scope of the disclosure.

What is described above is the core idea of the disclosure. In order to prepare those skilled in the art in better understanding the schemes of the disclosure, the disclosure will now be described in further detail with reference to the accompanying drawings.

Figure 3:
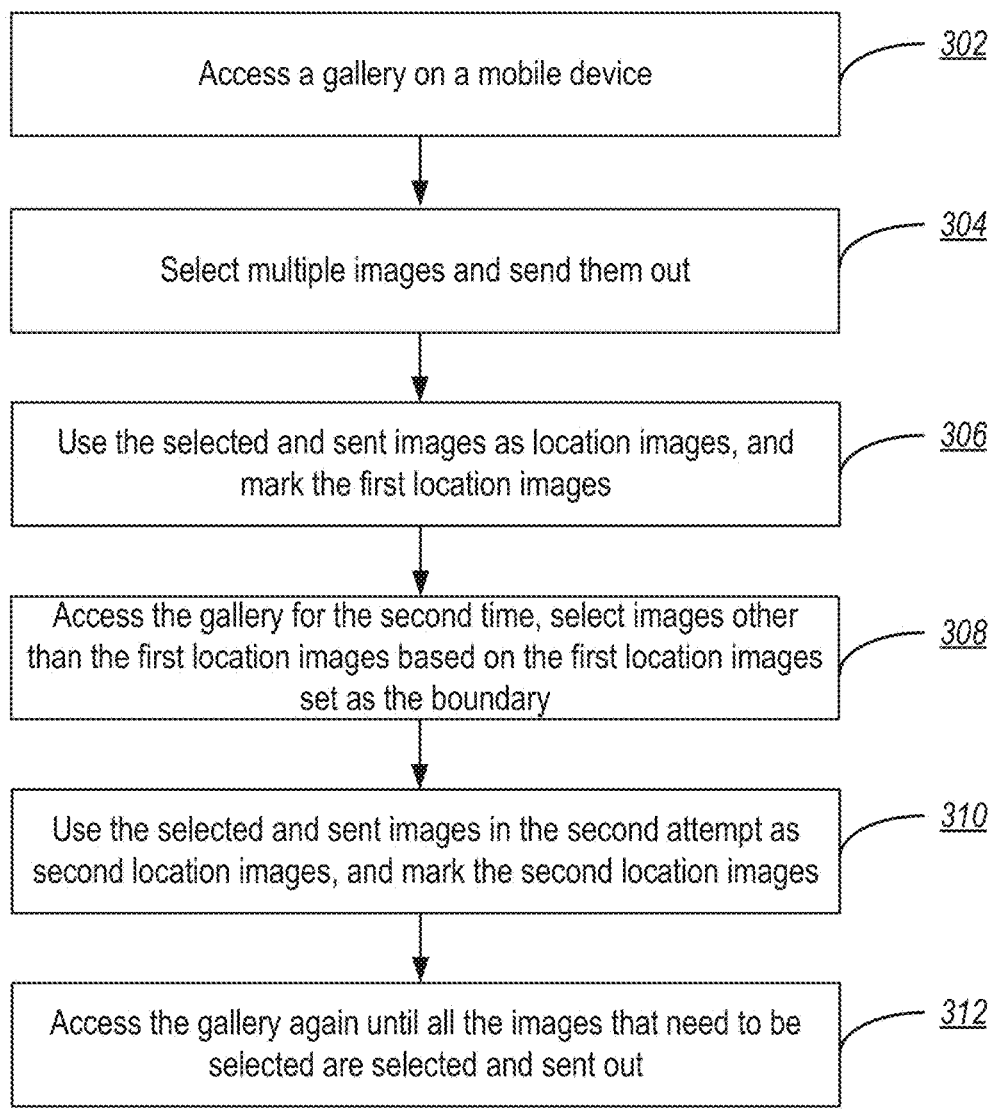
FIG. 3 is a flow diagram of an image sending method provided according to an embodiment of the disclosure.

The following describes in detail an image sending method implemented by the disclosure with references to accompanying drawings. In the process of implementing the image sending method according to an embodiment of the disclosure as shown in FIG. 3, when accessing a gallery on a mobile device for the first time (302), the image selection starts with one of the multiple images in the gallery. A user will select multiple images and send them out (304). These first selected multiple images are used as first location images, and these first location images are marked (306). Moreover, when it is necessary to access the gallery on the mobile device and select images for a second time, first the user may choose to scroll through and search for the first location images and use them as a boundary (308). The user may continue to select other images in the gallery and send out the selected images. Meanwhile, the images selected during the second access to the gallery are used as second location images, and these second location images are marked (310).

In addition, in one embodiment, the user may access the gallery for the third time and select images (312). The selected images may be marked as third marked images and be sent afterwards. Therefore, when more images are needed for selection, the selection can be done based on the first and second accesses of the gallery, and the selected images can be marked continuously to facilitate a quick identification of sent images in a subsequent access to the gallery, thereby increasing the image filtering speed. Such a procedure continues until all the images that need to be selected from the gallery are selected and sent.

In one embodiment, a method for marking images such as the first location images and second location images so they become the references for a subsequent image selection is described. Specifically, in one embodiment, a marking method for marking images selected from the gallery includes:

I. Marking the last image from the multiple images sequentially ordered and selected from the gallery in each attempt so that the last image can serve as a location image; and setting the location image as a boundary so that during the next access to the gallery, by finding this image, the user knows that images appearing ahead of this image have been browsed and images following this image have not.

II. Marking all of the multiple images selected from the gallery in each attempt and using them as location images, so that during the next access to the gallery, by finding these images, the user knows that all marked images have been sent during the last attempt, and thus the user can select directly from other images.

III. Grouping multiple images selected from the gallery in each attempt into the last image and the rest of the images (that is, of the several selected images, those that have been sent), and marking the last image and the rest differently so that the last image is distinguishable from the other images that have been sent among the identified images. In this way, in a subsequent access to the gallery, with the help of different markings, the user can identify the last image and the rest of sent images, set the last image as a boundary between 'images browsed' and 'images not yet browsed', and identify the rest of the images as 'sent images', thereby avoiding repetitive browsing and selection.

As a result, the speed of image filtering can be effectively improved by marking images selected by users via one of the three marking methods described above. Moreover, in one embodiment, the three marking methods mentioned above are merely three common implementation modes presented via this embodiment. This does not suggest that the marking of the images in the present application is limited to the above three marking methods.

Moreover, in one embodiment, the marking of the images in the disclosure includes marking selected images with dynamic identification or special style identification, or a combination of both. Moreover, in practice, the dynamic identification includes at least one of the following: jitter identification and flicker identification, and the special style identification includes at least one of the following: border identification, text identification, and symbol identification. An image can be marked with at least one of dynamic identifications, including jitter identification and flicker identification, or with at least one of special style identifications, including border identification, text identification, and symbol identification. Alternatively, or in conjunction with the foregoing, an image can be marked simultaneously with two of dynamic identifications, including jitter identification and flicker identification, or with two of special style identifications, including border identification, text identification, and symbol identification. Alternatively, or in conjunction with the foregoing, an image can be marked with a combination of one of dynamic identifications, including jitter identification and flicker identification and one of special style identifications, including border identification, text identification, and symbol identification, making it easier to identify an image.

Figure 4:
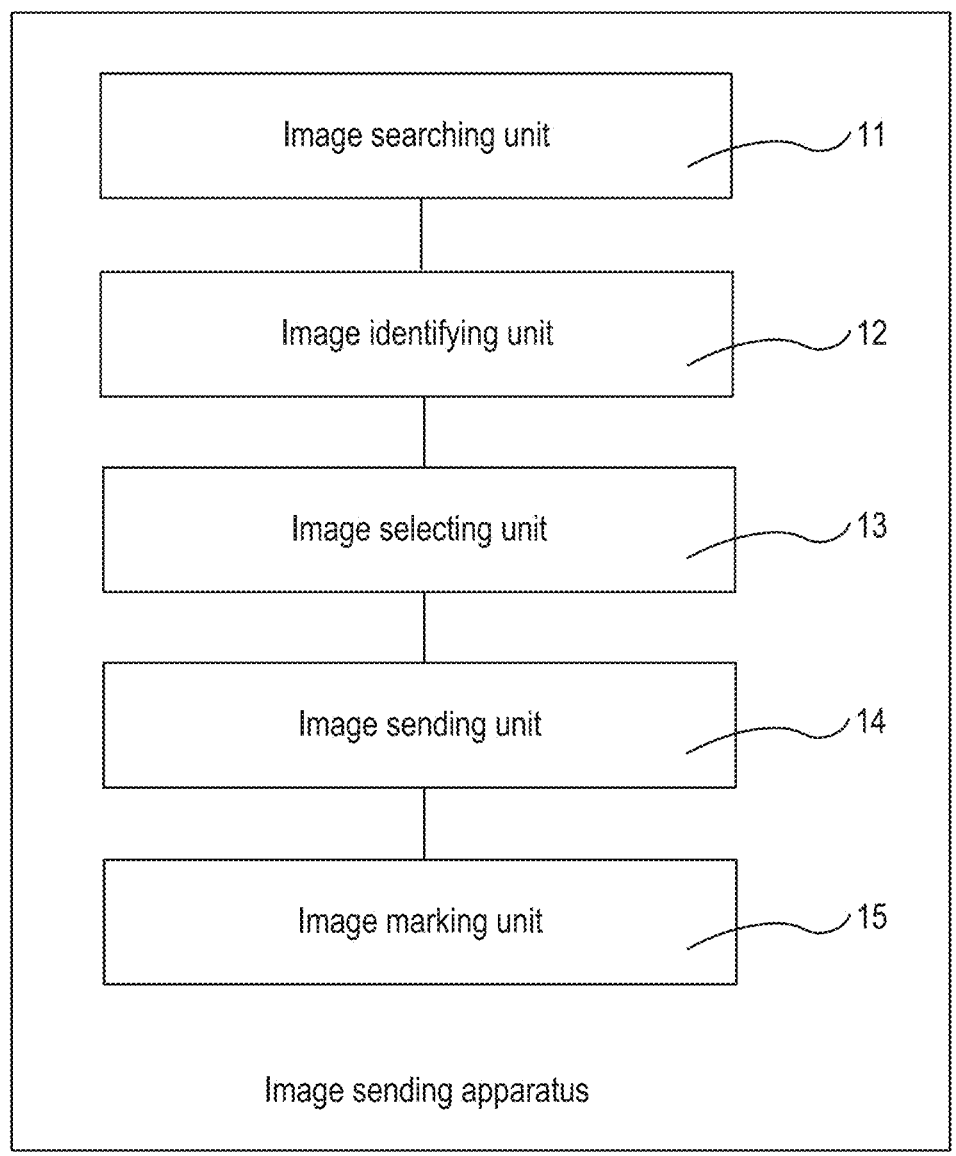
FIG. 4 is a block diagram of an image sending apparatus provided according to an embodiment of the disclosure.

As shown in FIG. 4, a structural schematic diagram of an image sending apparatus presented via an embodiment of the disclosure. The image sending apparatus may perform the image sending method described previously and comprises: an image searching unit 11, configured to search for a location image in a gallery; an image identifying unit 12, configured to identify the location image; an image selecting unit 13, configured to select images, other than the location image, in the gallery; an image sending unit 14, configured to send and share images selected by the image selecting unit; an image marking unit 15, configured to mark the selected image.

The image sending apparatus may further include a time setting unit, configured to set a threshold time period; the threshold time period is set for the selected images after they are marked by the image marking unit 15; when it reaches the threshold time period, the marking record of the images will be removed automatically; the threshold time period may be set to 1 hour or set as desired. In addition, the image searching unit 11, image identifying unit 12, image selecting unit 13, and image marking unit 15 are identical to those in the embodiment of the image selecting apparatus. Therefore, details are not repeated herein and references can be made by referring to the content of the embodiment of the image selecting apparatus. As for the image sending unit 14, images selected from the gallery at each attempt can be sent and shared through the image sending unit 14. The image sending unit 14 may include a sending module and a control module. Selected images can be sent via the sending module. After sending, the sent images are marked by the image identifying unit 15, controlled by the control module, so that sent images can be easily identified in a subsequent accessing of the gallery.

The image sending apparatus presented in this embodiment of the disclosure, together with the image sending method, is capable of sending selected images, and searching and browsing images in a subsequent process of sending images based on a previously marked location image, thereby avoiding repetitive browsing and selection, effectively shortening the time spent in sending image, and enhancing user experience.

Figure 5:
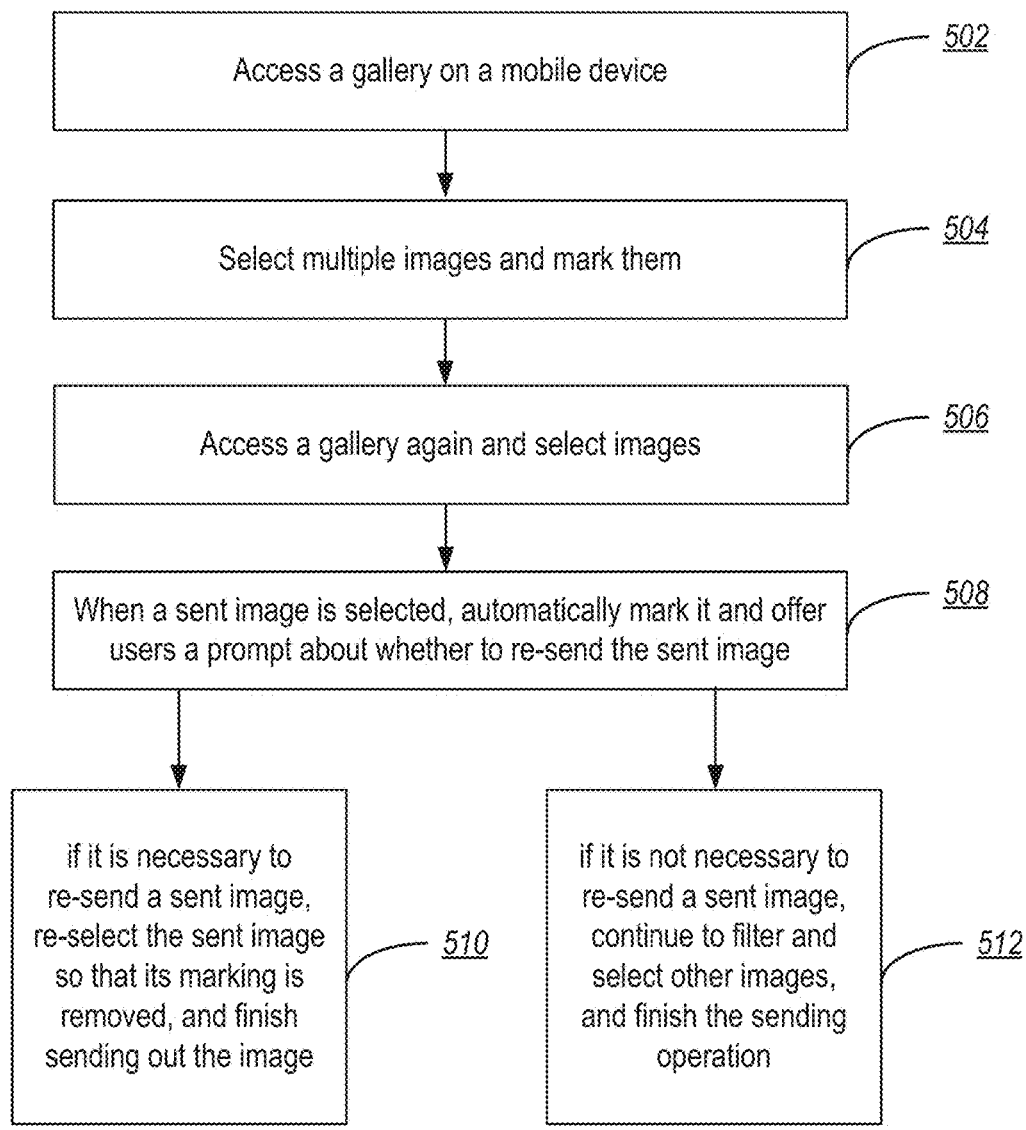
FIG. 5 is a flow diagram of a prompting method for sending repeated images provided according to an embodiment of the disclosure.

FIG. 5 is a flow diagram of a prompting method for sending repeated images provided according to an embodiment of the disclosure.

In the embodiment of a prompting method for sending repeated images presented by the disclosure as shown in FIG. 5, the method for selecting repeated images includes:

Step 1: select multiple images from a gallery, and mark the sent images.

In step 1, access is made to a gallery on a mobile device (502), and images are searched and identified so that images can be selected based on the boundary set via the identified location images; if no location image is identified, only multiple images from the first page of the gallery can be selected and sent (504).

Step 2: access the gallery again (506), and when a selected and sent image is selected, mark the sent image automatically and offer users a prompt about whether to re-send the selected image (508). It is necessary to send images that are previously sent, and therefore, it is necessary to access the gallery, find and select the corresponding location images, which at this time may be identified in another method different from the previous one, so as to give users a prompt about whether to re-send the sent images.

Step 3: based on needs, it is determined whether to re-send the sent images; if so, select and send the images; if not, continue to select other images;

When a sent image is selected, it may be determined whether it is necessary to re-send the image based on users' needs; if so, re-select the sent image so that its identifier is removed and a selected status is displayed, and send the image (510); if it is not necessary to re-send a sent image, continuing to scroll through and select other images and finishing the sending operation (512). Moreover, after sending, it is necessary to re-mark the sent images in this attempt so that a location image can easily be found in a subsequent access to the gallery; meanwhile, an automatic marking method for sent images includes at least one of the following: jitter identification and flicker identification, providing users a visual reminder for images sent repeatedly. According to the prompting method for sending repeated images in this embodiment of the disclosure, when selecting and sending images from a gallery, a sent image can be marked for a second time, thereby giving users an alert about whether to re-send the image. This effectively reduces the likelihood of unintentional operations and sending repetitive images.

In addition, the disclosure further provides an example which is, in particular, about sending selected images during cellphone operations. FIG. 7-11 illustrates sending and sharing of gallery images on a mobile device.

Figure 7:
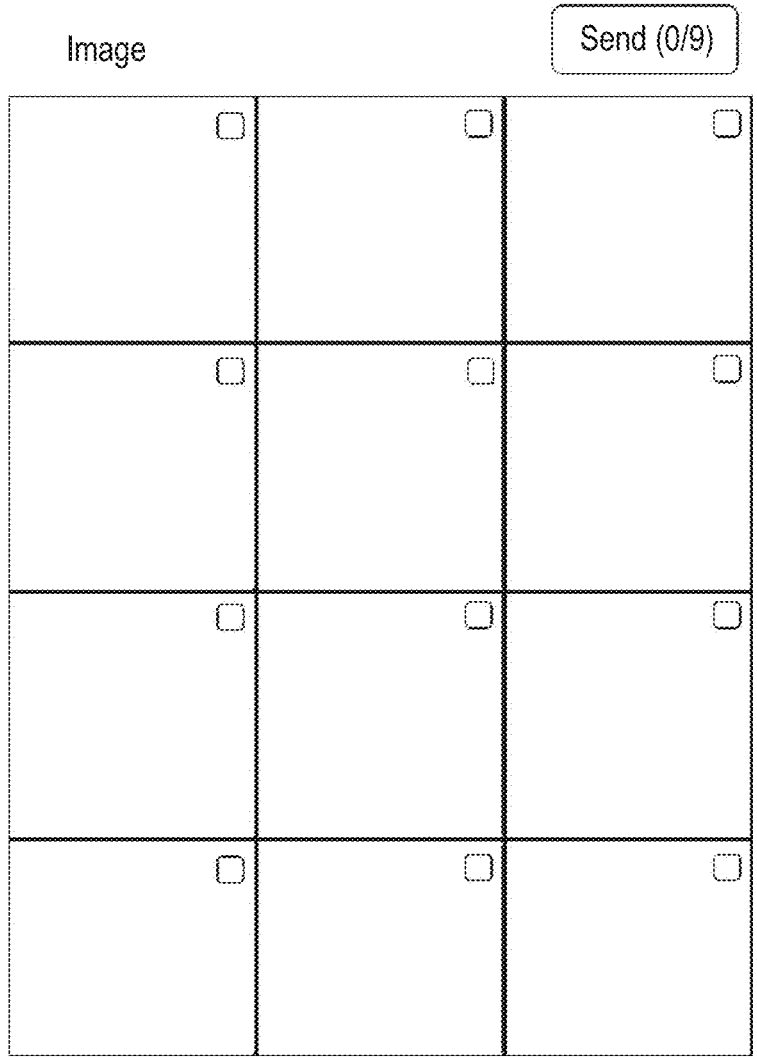
FIG. 7 is a diagram of a marking method for an image selecting method presented via an example of the disclosure.

FIG. 7 shows a user accessing a gallery on a mobile terminal and scrolling through images, but not selecting an image.

Figure 8:
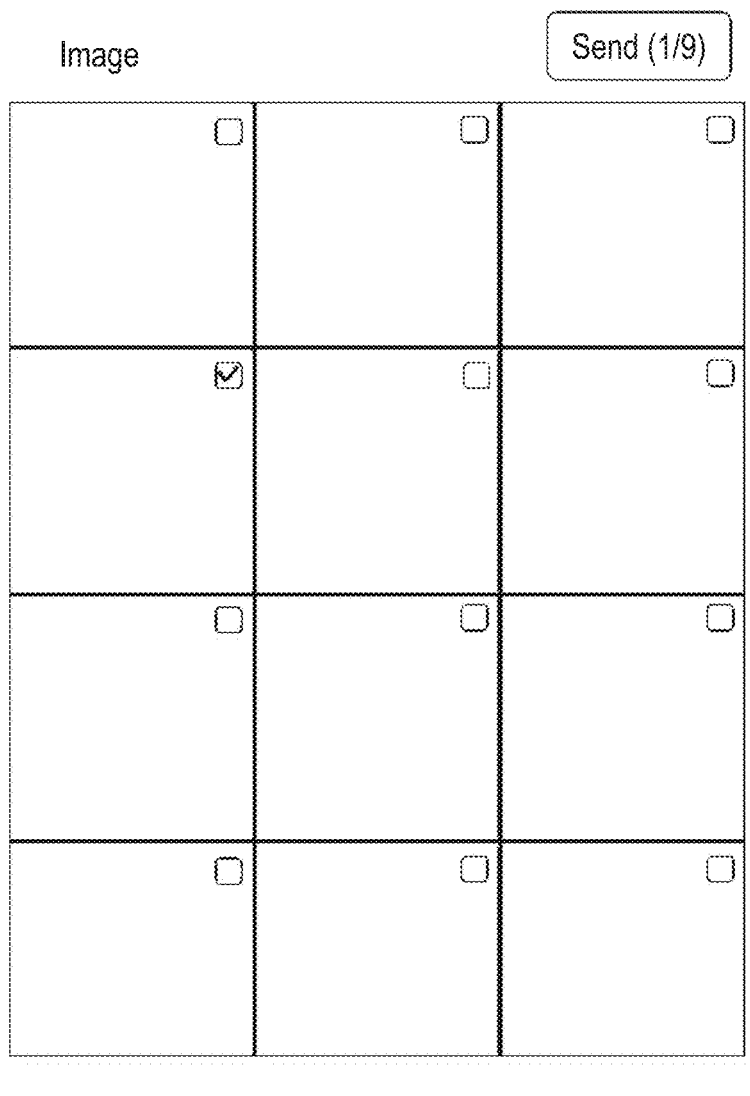
FIG. 8 is a diagram of a marking method for an image selecting method presented via an example of the disclosure.

FIG. 8 shows a user accessing a gallery on a mobile terminal and selecting a first image.

Figure 9:
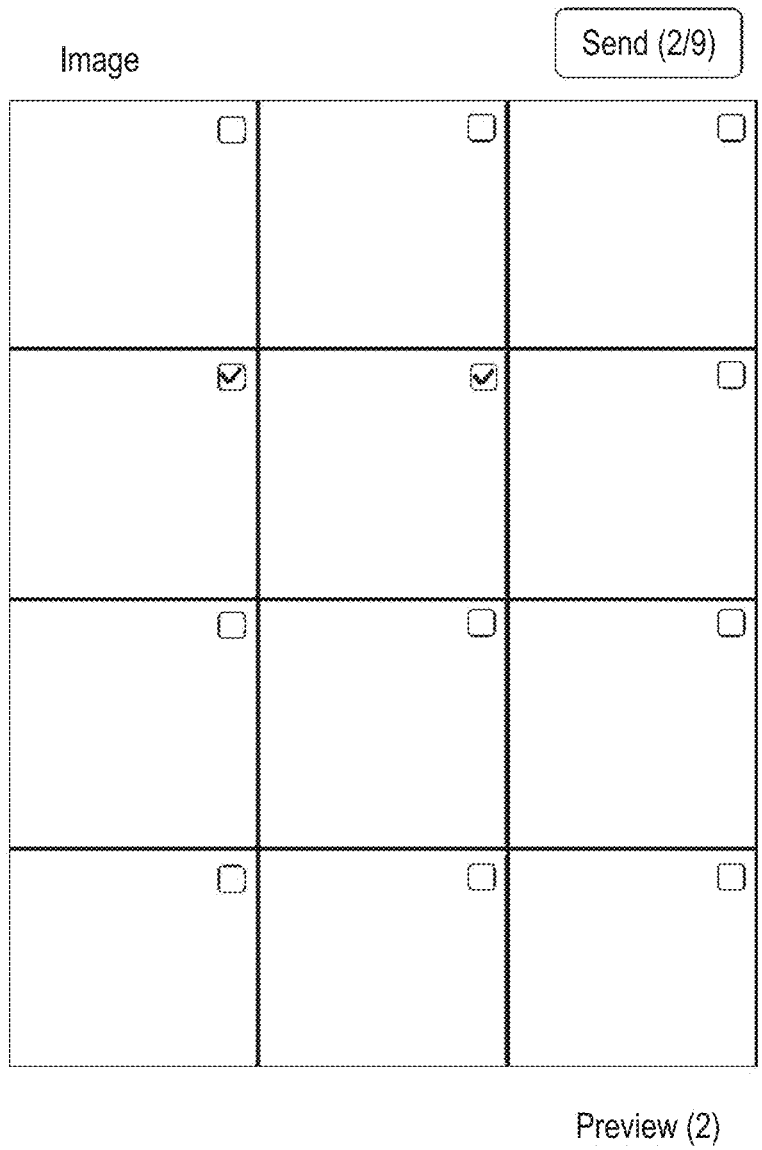
FIG. 9 is a diagram of a marking method for an image selecting method presented via an example of the disclosure.

FIG. 9 shows a user accessing a gallery on a mobile terminal and selecting a second image.

Figure 10:
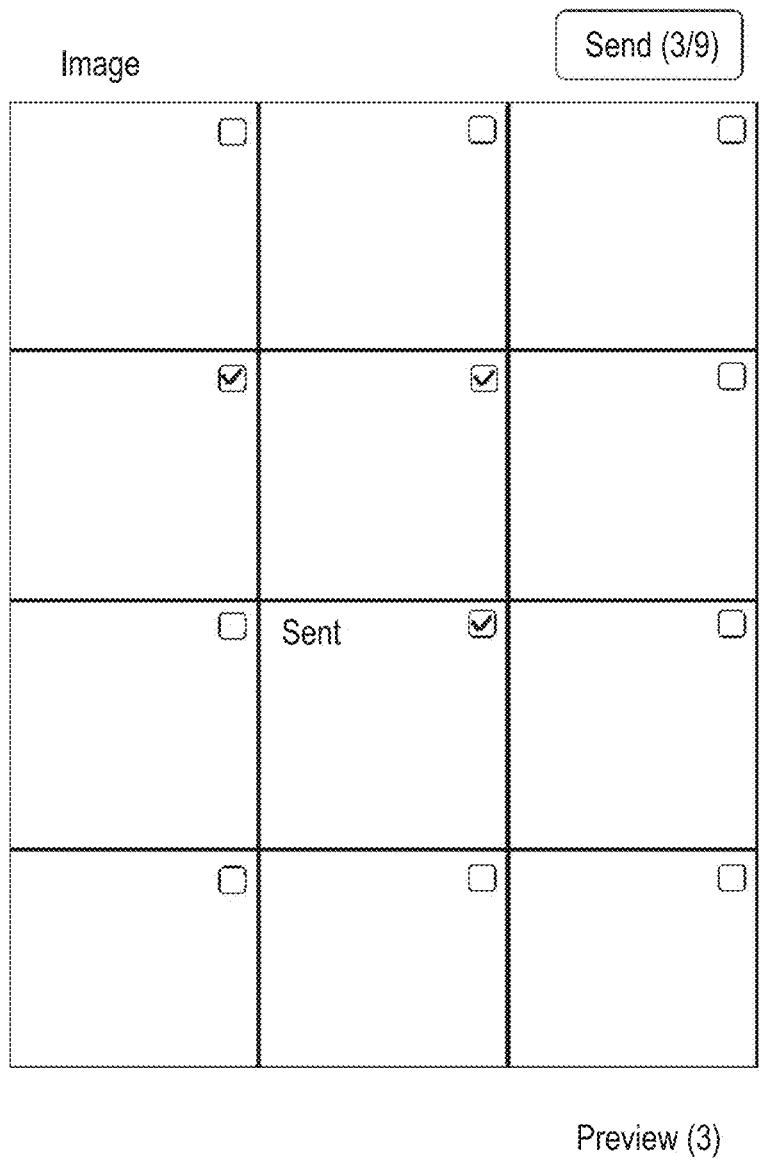
FIG. 10 is a diagram of a marking method for an image selecting method presented via an example of the disclosure.

FIG. 10 shows a user accessing a gallery on a mobile terminal and selecting a third image (which is an image previously sent).

Figure 11:
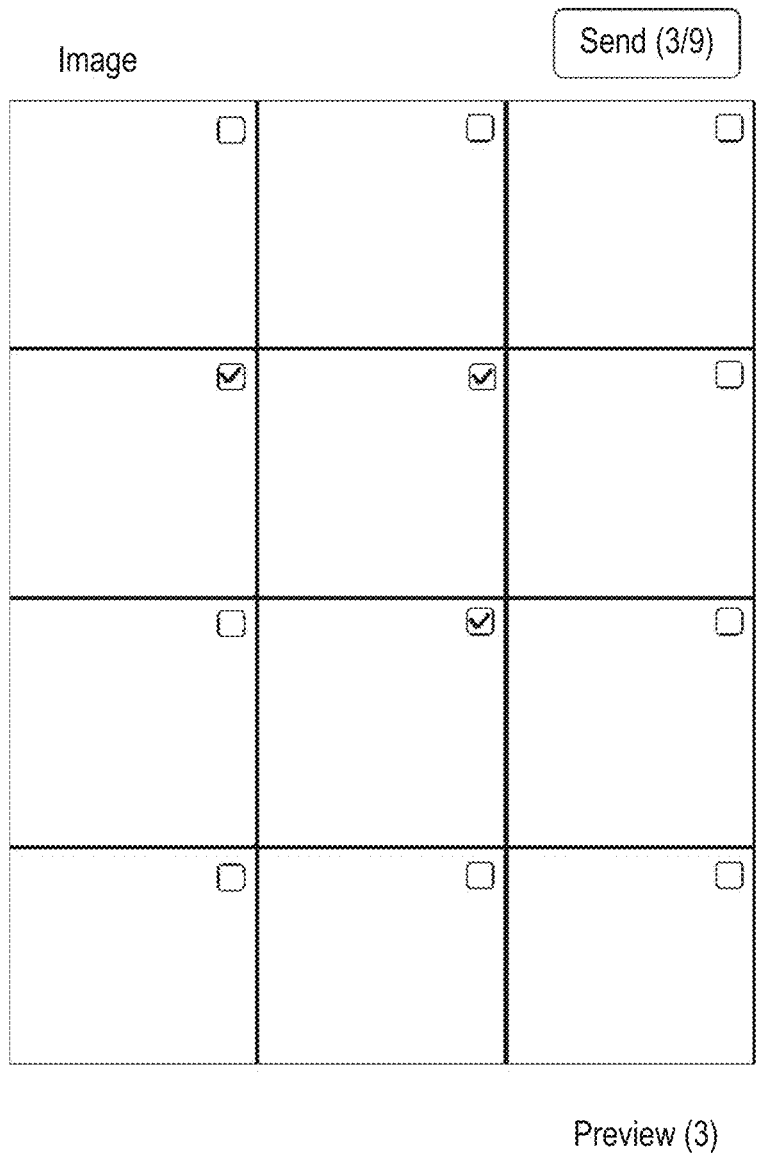
FIG. 11 is a diagram of a marking method for an image selecting method presented via an example of the disclosure.

FIG. 11 shows a user accessing a gallery on a mobile terminal and selecting a third image (showing the beginning of selection to the end of selection and the removal of the identifiers).

In these examples, the gallery contains a large number of images, and up to nine images can be selected from the gallery at each attempt for sending and sharing. First, a user accesses a gallery on a mobile device. From the first page of the gallery, the user successively selects nine images and finishes the sending and sharing of these nine images. The nine images are used as first location images and are marked, wherein the first eight images are marked with dynamic identification and the last image is marked with special style identification (or only the last image is marked with dynamic identification or special style identification, or all the images are marked with dynamic identification or special style identification). In particular, the first location images may be marked as follows: the first eight images are marked using jitter identification, and the last image is marked using flicker identification; that is, after the images are sent and shared for the first time, the first location images includes the eight images with jitter identification and the one image with flicker identification (or the first eight images are marked with special style identification indicating 'sent', and the last image is identified with jitter identification or flicker identification). Second, the user accesses the gallery for the second time. When scrolling through the screen, the user may realize that an image with jitter identification is a sent image, and an image with flicker identification is the last image previously selected. In this way, when selecting an image, the user will be able to judge that an image with flicker identification is the last image previously selected and set it as a boundary, browse directly from this boundary and select images appearing after this last image. The process also enables the user to quickly locate the previously selected images, and finish sending and sharing selected images in the second attempt. In addition, the images selected in the second attempt are used as second location images and marked, and the specific identifying method is identical to that for the first location images. That is, the first eight images selected in the second attempt are marked with jitter identification and the last selected image is marked with flicker identification, for ease of image selection during the next access to the gallery; the same process continues until all the images that need to be sent and shared are selected. Marking an image, for example, with flicker identification, is not shown in the drawings.

In addition, in one embodiment, for the nine images selected in the first attempt, the first eight images may be marked with the characters 'sent', and the last image of the nine may be marked with the characters 'last sent.' In this way, the user can directly find the last sent image from the marked found images, and set it as a boundary for further filtering and marking of images. Moreover, in some embodiments, the marking of the first location images may be automatically removed at the time when the second location images are marked, and the marking of the first location images may also be automatically removed after a certain period of time. Details of the specific marking method will not be repeated herein and references can be made to the marking methods mentioned above.

What is described above presents merely a method for marking a selected image in one embodiment; and it does not describe in detail how to access the gallery to select an image for a second time after marking. However, in one embodiment, marking a selected image is not limited to the previously presented method in which the first eight images are marked with jitter identification and the last image is marked with flicker identification. Another embodiment may be used as an alternative as long as it allows the user to quickly and effectively identify sent images via the marking of the selected images. Similar variations of the embodiment, therefore, are not described in detail herein.

In order to prepare those skilled in the art in better understanding the technical schemes in the embodiments of the disclosure, and to make the foregoing objects, features, and benefits of the embodiments of the disclosure more evident and comprehensible, in what follows references are made to accompanying drawings so as to provide a detailed description for a specific technical scheme in an example provided by the disclosure.

Figure 6:
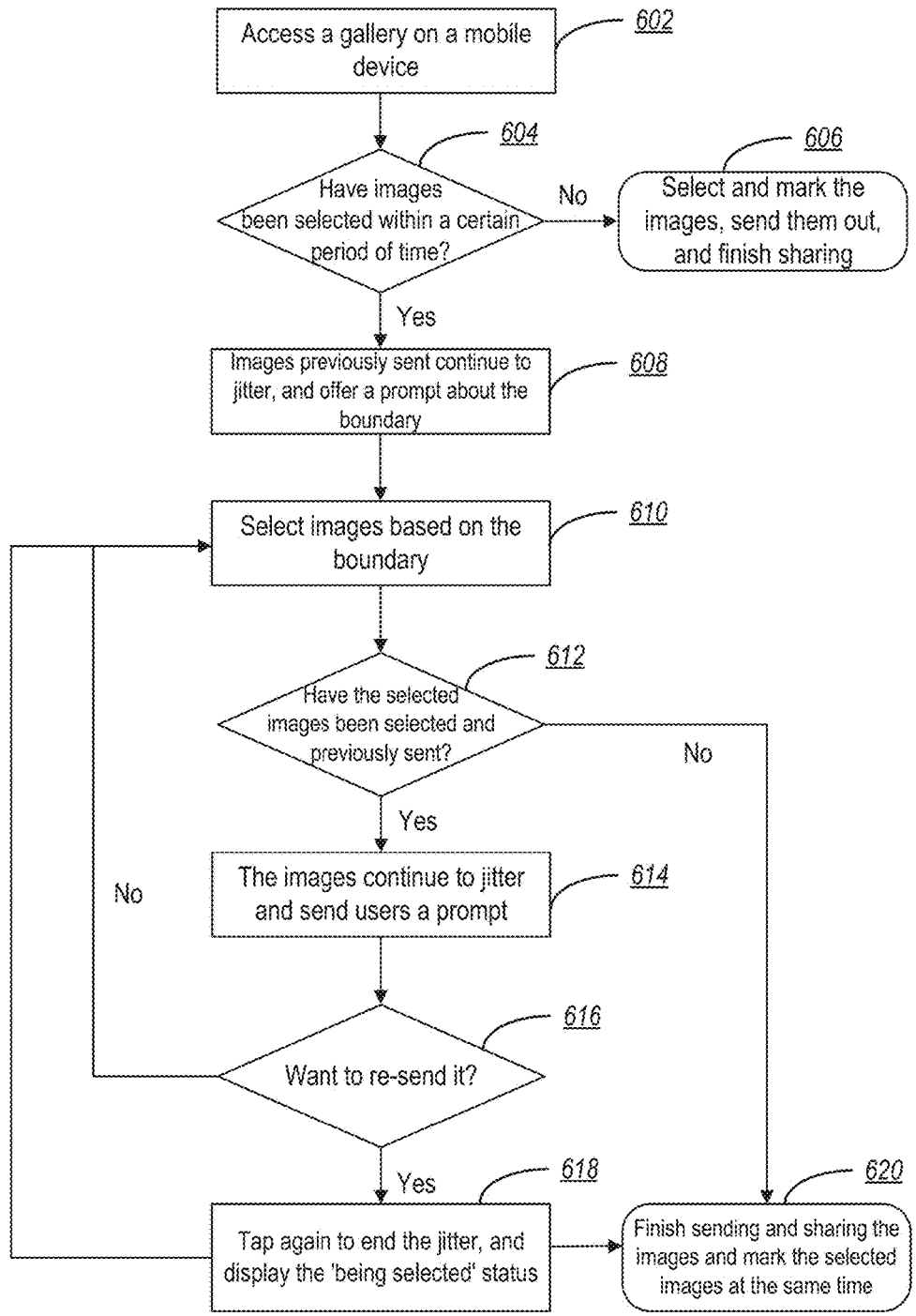
FIG. 6 is a flow diagram of an image selecting method presented via an example of the disclosure.

FIG. 6 is a flow diagram of an image sending method provided according to an embodiment of the disclosure.

As shown in the figure, in one embodiment, unintentional operations may occur when users scroll through the screen. For example, a sent image may be accidentally tapped, resulting in a selection of a repeated image. In another case, a repetitive selection of a sent image may be needed for sending the sent image. Thus, for a repeated sending or an individual's unintentional operation, an embodiment of the disclosure provides an operation method for a repeated selecting and sending of images, wherein in one embodiment, a user first accesses the gallery (602) and selects images (604) and finishes the sending operation (606); meanwhile, the selected images are used as first location images and are identified accordingly (608). In this embodiment, as shown in FIG. 10 and FIG. 11, 9 images are set as the standard for selection in each attempt; that is, for the first access to a gallery on a mobile device, a user selects images from a first page of the gallery, identifies all the 9 selected images with special styles, and finishes sending and sharing of the 9 selected images (606). When accessing the gallery on the mobile device for the second time, by scrolling through the screen of the mobile device, the user may identify images marked with special styles so that a selection of other images is made possible based on those marked images (610). However, in practice, the following two scenarios may occur: (1) when scrolling through the screen, the user may accidentally tap on an image marked with special styles (i.e. selects a sent image by mistake); (2) when scrolling through the screen, the user has a need to re-send this sent image; in either case, the user will need to re-select the sent image. Thus, in one embodiment, in the case of repeated sending or selection, when the user taps an image marked with the characters 'sent', for example, the 8th sent image in the first attempt, and the user selects the 8th sent image by tapping, and this image is marked with characters 'sent', then this 8th sent image will be re-marked in a method different from the one used in the first attempt (612). In this embodiment, the image may be re-marked with dynamic identification; in particular, the 8th image may be re-marked with flicker identification (614). In other words, the 8th sent image may be marked with flicker identification during re-selection, thereby prompting the user that the image has been previously sent and prompting the user whether it is necessary to re-send this image (616). (The marking of a selected image during a re-selection is not shown in the drawings.)

In actual application, the user needs to determine, according to real situations, whether it is necessary to re-send an image (616). If it is necessary to re-send the 8th image, the user will tap on the image again to select it. Meanwhile, the 'sent' identification and flicker identification on the image will be removed as shown in FIG. 8 (618), with merely displaying a selected status (during each access to the gallery, all selected images are in a selected status), thereby finishing the sending and sharing of the image (620); if it is not necessary to re-send the 8th image, the user may continue to scroll through the screen and select other images and finish the sending operation. In this way, a re-selection process of the images is completed, thereby effectively reducing an unintentional operation when scrolling through the images, and minimizing unnecessary repetitive selections during the image selection.

In one embodiment, after a user re-sends sent images and finishes sending and sharing of the images, the sent images in this attempt need to be re-marked (620); that is, the selected and sent images need to be marked in each attempt so that in a subsequent access to the gallery, images can be filtered directly according to the marked images in the last attempt, thereby effectively shortening the time spent in scrolling through images and improving filtering efficiency. Moreover, in the implementation process, when the user accesses the gallery again for image selection and selects second location images, the second location images will be marked; meanwhile, marking of the first location images will be removed so that the secondly marked images will become the reference for a subsequent access to the gallery, enabling a fast identification of the previously sent images. However, when second location images are being marked, first location images may maintain the marked status; that is, the first location images and the second location images may exist at the same time so that the information on sent images can be clearly obtained when the gallery is accessed again. Nevertheless, in one embodiment, in order to prevent a prolonged marking of images, an automatic time-marking may be set for a marked image, and the automatically time-marking period may be 1 hour (604); in other words, the marking on the image will last for 1 hour after the image is marked; and the marking will be removed automatically after 1 hour. This makes it possible to perform a time-bound marking on gallery images.

Moreover, in one embodiment, during re-selection, the second location images may be re-marked for the sent images that are re-selected, distinguishing these from other selected images. In this embodiment, an image with characters 'sent' is re-marked with flicker identification; but in one embodiment, re-marking of sent images is not limited to the marking methods presented in this embodiment. A sent image marked with jitter identification may be re-marked with an acute jitter to differentiate it, and prompt the user that it is a sent image. The re-marking methods for sent images, however, are not limited thereof and will not be exemplified and illustrated one by one herein. Marking methods may vary so that a re-marking method is different from the one used in a previous attempt. Users will then be prompted and they will be able to distinguish between the two kinds of images.

The image selecting method implemented by the disclosure mainly involves: a user marks browsed and selected images; and by using the marked image as reference, the user may select other images from the gallery for sending and sharing when accessing the gallery later; this cycle will be repeated, wherein selected images are marked in each attempt for locating and a quick selection of images in the next filtering process, thereby finishing sending and sharing of images in the gallery. This method enables a quick locating of images that are selected and sent at each attempt and facilitates a subsequent image selection via the provided boundary; further, the method effectively enhancing the filtering speed and efficiency. In addition, the summary of the re-selecting method shows that it can prevent or reduce the possibility of an unintentional operation and a repetitive sending of images of the gallery.

Each embodiment in this specification is described in a progressive manner, wherein mutual reference can be made to identical or similar parts among each of the embodiments; and the description of each embodiment focuses on its differences from the other embodiments. The methods described in the embodiments above are merely schematic. In the marking methods and marking methods described in relation to the marking process, an image may or may not be marked via software, and may also be marked via a marking unit on a touch screen when a user's finger taps the image information displayed on the screen. The marking unit may be located in a software section, or may be a hardware unit distributed on the touch screen of a mobile device. Part or all of the modules can be selected to implement the purpose of the embodiment schemes according to actual needs. This may be understood and implemented by those skilled in the art without making creative effort.

It will be appreciated that the disclosure is applicable to numerous general-purposed or special-purposed computing system environments or configurations, such as personal computers, server computers, hand-held devices, or portable devices, tablet devices, network PCs, minicomputers, mainframe computers, and distributed computing environments including any of the systems or devices thereof.

It should be noted that, relational terms such as ' first' and 'second' are used herein only to distinguish one entity or operation from another entity or operation without necessarily requiring or implying that these actual relations or orders exist for these entities or operations. Moreover, the terms 'including', 'comprising', or any other variations thereof are intended to encompass a non-exclusive inclusion so that a process, method, article, or device that includes a series of elements includes not only those elements but also other elements not explicitly listed, or elements that are inherent to such a process, method, article, or device. The element defined by the statement 'comprising one . . . ', without further limitation, does not preclude the presence of additional identical elements in the process, method, article, or device that includes the element.

The above description are merely specific embodiments of the disclosure, so that those skilled in the art understand or can implement the disclosure. A wide variety of modifications to these embodiments will be readily apparent to those skilled in the art, and the general principles defined herein may be implemented in other embodiments without departing from the spirit or scope of the disclosure. Therefore, the disclosure will not be limited to these embodiments illustrated herein, but rather be consistent with the principles and novelties disclosed herein to the possibly utmost extent.

The above description are merely specific embodiments of the disclosure. It should be noted that improvements and refinements may be made by those skilled in the art without departing from the principles of the disclosure, and these improvements and refinements shall also fall within the protection scope of the disclosure.

What is claimed is:

1. A method comprising:
accessing a gallery of images;
determining if a location image exists within the gallery of images, the location image comprising an image in the gallery previously interacted with by the user;
selecting a first subset of images from the gallery of images, wherein the first subset of images is positioned after the location image if a location image exists;
marking the first subset of images using an identification method, the marking representing a transmission status of the first subset of images;
receiving a selection of a selected image from the first subset of images;
prompting the user to request authorization to re-transmit the selected image;
if the user confirms re-transmission, removing the marking from the selected image and transmitting the selected image to a remote server; and
if the user denies re-transmission, allowing the user to select one or more other images and transmitting the one or more other images to a remote server, wherein the other images do not include the selected image.

2. The method of claim 1 further comprising transmitting the first subset of images to a remote server prior to marking the first subset of images.

3. The method of claim 2 further comprising:
identifying the first subset of images as first location images;
re-accessing the gallery of images;
selecting a second subset of images from the gallery of images, wherein the second subset of images is positioned after at least one of the first location images;
transmitting the second subset of images to a remote server; and
marking the second subset of images and identifying the second subset of images as second location images.

4. The method of claim 1 further comprising
determining if a plurality of previously selected images in the gallery of images have been previously selected within a predefined time interval prior to accessing the gallery of images;
marking the previously selected images; and
transmitting the previously selected images to a remote server.

5. The method of claim 1, wherein marking the first subset of images comprises:
arranging the first subset of images in sequential order; and
marking the last image of the ordered first subset of images as the location image.

6. The method of claim 1, wherein marking the first subset of images comprises:
marking each image of the first subset of images; and
using each image in the first subset of images as location images.

7. The method of claim 1, wherein marking the first subset of images comprises:
marking a last image in the first subset of images with a first identification method;
marking remaining images in the first subset of images with a second identification method, wherein the remaining images does not include the last image;
using the last image and remaining images as location images.

8. The method of claim 1 wherein the identification method includes one of a dynamic identification method and a special style identification method.

9. The method of claim 8 wherein the dynamic identification method includes one of a jitter identification method and flicker identification method and wherein the special style identification method includes one of a border identification method, text identification method, and symbol identification method.

10. An apparatus comprising:
one or more processors; and
a non-transitory memory storing computer-executable instructions therein that, when executed by the processors, cause the apparatus to:
access a gallery of images;
determine if a location image exists within the gallery of images, the location image comprising an image in the gallery previously interacted with by the user;
select a first subset of images from the gallery of images, wherein the first subset of images is positioned after the location image if a location image exists;
mark the first subset of images using an identification method, the marking representing a transmission status of the first subset of images;
receiving a selection of a selected image from the first subset of images;
prompting the user to request authorization to re-transmit the selected image;
if the user confirms re-transmission, removing the marking from the selected image and transmitting the selected image to a remote server; and
if the user denies re-transmission, allowing the user to select one or more other images and transmitting the one or more other images to a remote server, wherein the other images do not include the selected image.

11. The apparatus of claim 10 wherein the instructions further include instructions causing the apparatus to transmit the first subset of images to a remote server prior to marking the first subset of images.

12. The apparatus of claim 11 wherein the instructions further include instructions causing the apparatus to:
identify the first subset of images as first location images;
re-access the gallery of images;
select a second subset of images from the gallery of images, wherein the second subset of images is positioned after at least one of the first location images;
transmit the second subset of images to a remote server; and mark the second subset of images and identify the second subset of images as second location images.

13. The apparatus of claim 10 wherein the instructions further include instructions causing the apparatus to:
   determine if a plurality of previously selected images in the gallery of images have been previously selected within a predefined time interval prior to accessing the gallery of images;
   mark the previously selected images; and
   transmit the previously selected images to a remote server.

14. The apparatus of claim 10, wherein the instructions causing the apparatus to mark the first subset of images includes instructions causing the apparatus to:
   arrange the first subset of images in sequential order; and
   use the last image of the ordered first subset of images as the location image.

15. The apparatus of claim 10, wherein the instructions causing the apparatus to mark the first subset of images includes instructions causing the apparatus to:
   mark each image of the first subset of images; and
   use each image in the first subset of images as location images.

16. The apparatus of claim 10, wherein the instructions causing the apparatus to mark the first subset of images includes instructions causing the apparatus to:
   mark a last image in the first subset of images with a first identification method;
   mark remaining images in the first subset of images with a second identification method, wherein the remaining images does not include the last image;
   using the last image and remaining images as location images.

17. The apparatus of claim 10 wherein the identification method includes one of a dynamic identification method and a special style identification method.

18. The apparatus of claim 17 wherein the dynamic identification method includes one of a jitter identification method and flicker identification method and wherein the special style identification method includes one of a border identification method, text identification method, and symbol identification method.

* * * * *